United States Patent Office 2,793,562
Patented May 28, 1957

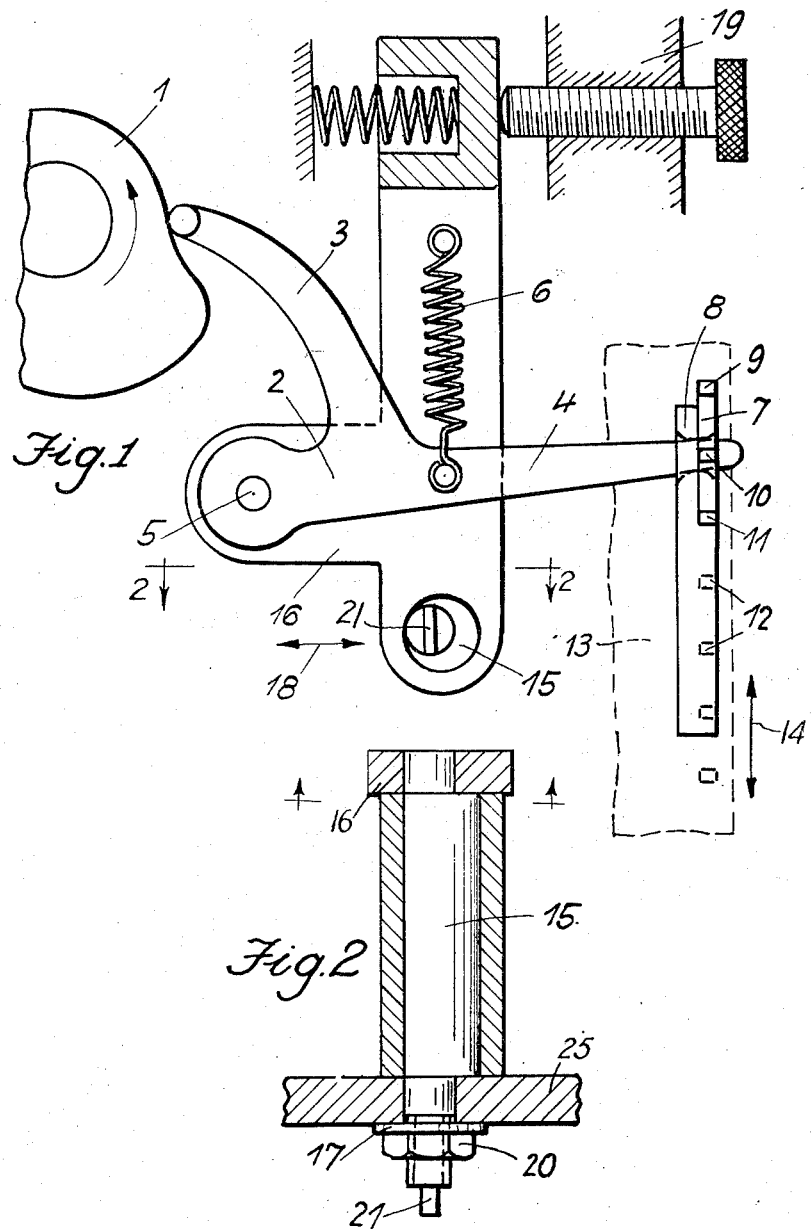

2,793,562

DEVICE FOR ADJUSTING THE FILM TRANSPORT CONTROL IN MOTION PICTURE APPARATUS

Gerd Grenzig, Berlin-Siemensstadt, Germany, assignor to Siemens & Halske Aktiengesellschaft, Munich and Berlin, Germany, a German corporation Application February 16, 1954, Serial No. 410,533

Claims priority, application Germany March 6, 1953

1 Claim. (Cl. 88—18.4)

This invention is concerned with a device for adjusting the film transport control and especially the transport control member in motion picture apparatus.

The endeavors to allocate the greatest possible part of the total time allowed for each picture change to the time interval during which the individual film pictures or frames stand still, so as to extend the illumination time and therewith to improve the brightness of the pictures, has led to increasingly stricter requirements so far as the "switching ratio" is concerned. The term "switching ratio" is intended to mean the ratio of the time consumed in the actual film transport as compared with the total time required for one picture change, the latter interval including the film transport and also the interval during which the picture stands still. Modern motion picture apparatus frequently provide a switching ratio on the order of 1:9.

If it is in such cases assumed that there are, as required for sound film purposes, 24 picture changes per second, there will be, with a switching ratio of 1:9, only about $\frac{1}{216}$ second available for the film transport or motion. The highest speed is required for the motion of the film transport actuating member or lever or rather to say for its actuating points during the interval when it moves downwardly so as to move the film. There is considerably more time available for the motions of the actuating member toward and away from the film, that is, for its film transport engaging and disengaging motion, respectively.

It has now been found that manufacturing tolerances in the transport control often cause an undesirable alteration of the amount of displacement of the transport actuating member.

The present invention eliminates the detrimental effect of these tolerances by the provision of means for adjusting the position of the transport actuating member or lever within certain limits which may be on the order of about 0.08 to 0.001 millimeter.

It is particularly advantageous to provide within the transport control an adjustable eccentric shaft for variably positioning the pivot point of the actuating lever or member so as to adjust such member with respect to the film transport member for the purpose of compensating manufacturing tolerances, thus permitting adjustment of the displacement of the actuating member in accordance with theoretical requirements.

An embodiment of the invention will now be described with reference to the accompanying drawing showing an example thereof. In the drawing, Fig. 1 is a diagrammatic in part sectional view of an arrangement according to the invention, as seen along line 1—1 of Fig. 2, showing the eccentric shaft in elevational end view; and Fig. 2 is a sectional view taken approximately along line 2—2 of Fig. 1, showing the adjustable eccentric shaft in elevation.

The drawing shows only part of the film transport mechanism comprising the cam 1 which moves the actuating member or lever in downward direction. The cam which moves such member perpendicularly to its downward motion has been omitted because it does not form part of the invention.

The actuating member 2 has two arms 3 and 4 and is pivotally disposed at 5. A spring 6 engages the arm 4 to bias it in counterclockwise direction. The arm 4 actuates a transport member 7 which moves within a slide 8.

The transport member 7 has three teeth or fingers 9, 10, 11 which serve in known manner for transporting the film 13 by engagement with the perforations 12 therein. The arrows 14 indicate the direction of motion of the transport member 7.

In accordance with the invention, the transport control is provided with an eccentric shaft 15 extending through an adjusting member or lever 16. The eccentric shaft is easily accessible from the outside. The adjustment is effected by loosening the nut 20 which engages the washer 17 and thereafter turning the eccentric 15, by means of the head 21, within its stationary mounting 25 to cause the extension on the eccentric shaft to move the adjusting member 16 laterally either to the right or to the left as indicated by the arrows 18. The lateral motion or displacement of the adjusting member 16 is on the order of about 0.4 millimeter.

The arms 3 and 4 of the actuating member or lever are of different configuration and length and the lateral displacement of such member by about 0.4 millimeter effects a change in the leverage thereof, with respect to the transport member 7, which is on the order of about 0.08 to 0.001 millimeter.

If the axis of the eccentric shaft 15 is, for example, moved to the left, the lever arm 4 of the actuating member 2 will be lengthened; and if the eccentric axis is moved to the right, the lever arm 4 will be shortened. This displacement effects the adjustment of the previously calculated theoretical leverage and the manufacturing tolerances are in this manner compensated.

The adjustment is effected once prior to the delivery of the apparatus.

Numeral 19 indicates part of the device for adjusting the picture level of the film. This device does not form part of the invention and therefore has been indicated only frictionally.

What is believed new and desired to have protected by Letters Patent is defined in the appended claim.

I claim:

Motion picture apparatus comprising a transport member for moving a film to be played, an actuating member comprising a lever arm for moving said transport member, a device forming a pivot for said lever arm, said device comprising an elongated adjusting lever, an eccentric for adjusting said device to adjust the position of said pivot for the purpose of regulating the position of said lever arm with respect to said transport member, said pivot extending from said eccentric through said adjusting lever at one end of said adjusting lever, means for fixing said eccentric in adjusted position thereof, stationary means for rotatably mounting said eccentric, means for resiliently mounting said adjusting lever near the opposite end thereof, said resilient mounting means comprising a spring anchored at one end and engaging said adjusting lever with its other end, and means in engagement with said adjusting lever for moving it relative to said spring.

References Cited in the file of this patent

UNITED STATES PATENTS

| 1,984,143 | Kraft | Dec. 11, 1934 |
| 2,521,957 | Wittel | Sept. 12, 1950 |

FOREIGN PATENTS

| 451,393 | Germany | Oct. 21, 1927 |
| 424,487 | Italy | June 3, 1947 |